United States Patent [19]
Fujii

[11] Patent Number: 5,165,495
[45] Date of Patent: Nov. 24, 1992

[54] ELECTRICALLY DRIVEN POWER STEERING APPARATUS

[75] Inventor: Tadaaki Fujii, Saitama, Japan

[73] Assignee: Jidosha Kiki Co., Ltd., Tokyo, Japan

[21] Appl. No.: 665,334

[22] Filed: Mar. 6, 1991

[30] Foreign Application Priority Data

Mar. 28, 1990 [JP] Japan .................. 2-32545[U]

[51] Int. Cl.$^5$ .................................................. B62D 5/04
[52] U.S. Cl. ........................................ 180/79.1; 74/402; 74/409; 74/417; 267/161
[58] Field of Search ............... 180/79.1, 147, 148; 74/388 PS, 409, 402, 417, 459.5, 461; 267/158, 161, 47

[56] References Cited

U.S. PATENT DOCUMENTS

| 782,210 | 2/1905 | Sester | 74/402 |
| 1,291,047 | 1/1919 | McKenna | 74/402 |
| 1,309,093 | 7/1919 | Hoover | 74/402 |
| 4,528,862 | 7/1985 | Goldowsky | 74/409 |
| 4,898,258 | 2/1990 | Ohe | 180/79.1 |
| 5,078,225 | 1/1992 | Ohmura et al. | 180/79.1 |

FOREIGN PATENT DOCUMENTS

3835955 5/1989 Fed. Rep. of Germany ..... 180/79.1
226362 9/1986 Japan.

Primary Examiner—Charles A. Marmor
Assistant Examiner—Anne Marie Boehler
Attorney, Agent, or Firm—Flynn, Thiel, Boutell & Tanis

[57] ABSTRACT

An improvement to an electrically driven power steering apparatus which utilizes an electric motor is disclosed. A bevel gear of a greater diameter is mounted on a steering shaft so as to be axially displaceable thereon, and an urging mechanism is connected between the bevel gear and the steering shaft. The urging mechanism renders the bevel gear to be incapable of rotation relative to the steering shaft, and also urges the teeth thereof toward the teeth of a bevel gear of a reduced diameter which is coupled to the electric motor. This prevents a backlash from occurring between the both bevel gears, thus preventing the occurrence of sounds of percussion as the both gears abut against each other.

8 Claims, 3 Drawing Sheets

ELECTRICALLY DRIVEN POWER STEERING APPARATUS

FIELD OF THE INVENTION

The invention relates to a power steering apparatus which utilizes an electric motor, and more particularly, to such apparatus which is designed to prevent sounds of percussion from occurring which may be caused by a backlash of a gear which provides a power transmission from an electric motor to a steering shaft.

DESCRIPTION OF THE PRIOR ART

An electrically driven power steering apparatus is known in the art, as disclosed in Japanese Laid-Open Patent Application No. 226,362/1986, for example, comprising a steering shaft which is rotatably mounted and coupled to a steering wheel, a bevel gear of a reduced diameter which is coupled to an electric motor, and a bevel gear of a greater diameter mounted on the steering shaft for meshing engagement with the bevel gear of reduced diameter.

In the described apparatus, a backlash occurs between the teeth of the both bevel gears, giving rise to producing sounds of percussion as the teeth of the both gears abut against each other during the rotation of the steering shaft. In order to prevent such backlash from occurring, the teeth of the both gears must be machined very precisely, but as a matter of practice, it has been difficult to achieve a complete elimination of the backlash.

In the prior art practice, the bevel gear of greater diameter has been mounted on the steering shaft either by fitting the gear to the steering shaft through a splined engagement or by utilizing a key member which engages both the steering shaft and the bevel gear. However, when the both members are splined together, a very small clearance will be produced between the splined parts of the both members, and if the both members are coupled together by means of the key member, a small clearance will also be produced between the key member and either member. Such clearance gives rise to the occurrence of sounds of percussion as the bevel gear abuts against the steering shaft or the key member abuts against either member.

SUMMARY OF THE INVENTION

Accordingly, it is an object of the invention to prevent sounds of percussion from occurring in an electrically driven power steering apparatus which may be caused by a backlash of a power transmitting gear or gears.

Specifically, the invention is applied to an electrically driven power steering apparatus including a steering shaft rotatably mounted and coupled to a steering wheel, a bevel gear of a reduced diameter which is coupled to an electric motor, and a bevel gear of a greater diameter mounted on the steering shaft for meshing engagement with the bevel gear of a reduced diameter. In accordance with the invention, the bevel gear of greater diameter is mounted on the steering shaft so as to be axially displaceable relative thereto, and means is provided for urging the teeth of the bevel gear of greater diameter toward the teeth of the bevel gear of reduced diameter, thereby enabling such means to couple the bevel gear of greater diameter to the steering shaft in a manner which prevents a relative rotation therebetween.

With the described arrangement, the urging means urges the teeth of the bevel gears of both greater and reduced diameter toward each other to thereby prevent a backlash from occurring between the teeth of these gears. In this manner, the occurrence of sounds of percussion which may result from the abutment of the teeth of these gears against each other may be prevented.

It is to be noted that because the bevel gear of greater diameter is coupled to the steering shaft in a manner to prevent a relative rotation therebetween by means of the urging means, a clearance between the splined parts or between a key member and its associated member which may be produced when the both members are splined together or the both members are connected together by means of the key member in order to prevent a relative rotation circumferentially as experienced in the prior art cannot be produced, thus preventing the occurrence of sounds of percussion.

Above and other objects, features and advantages of the invention will become apparent from the following description with reference to the attached drawings.

DETAILED DESCRIPTION OF EMBODIMENTS

Figure 1:
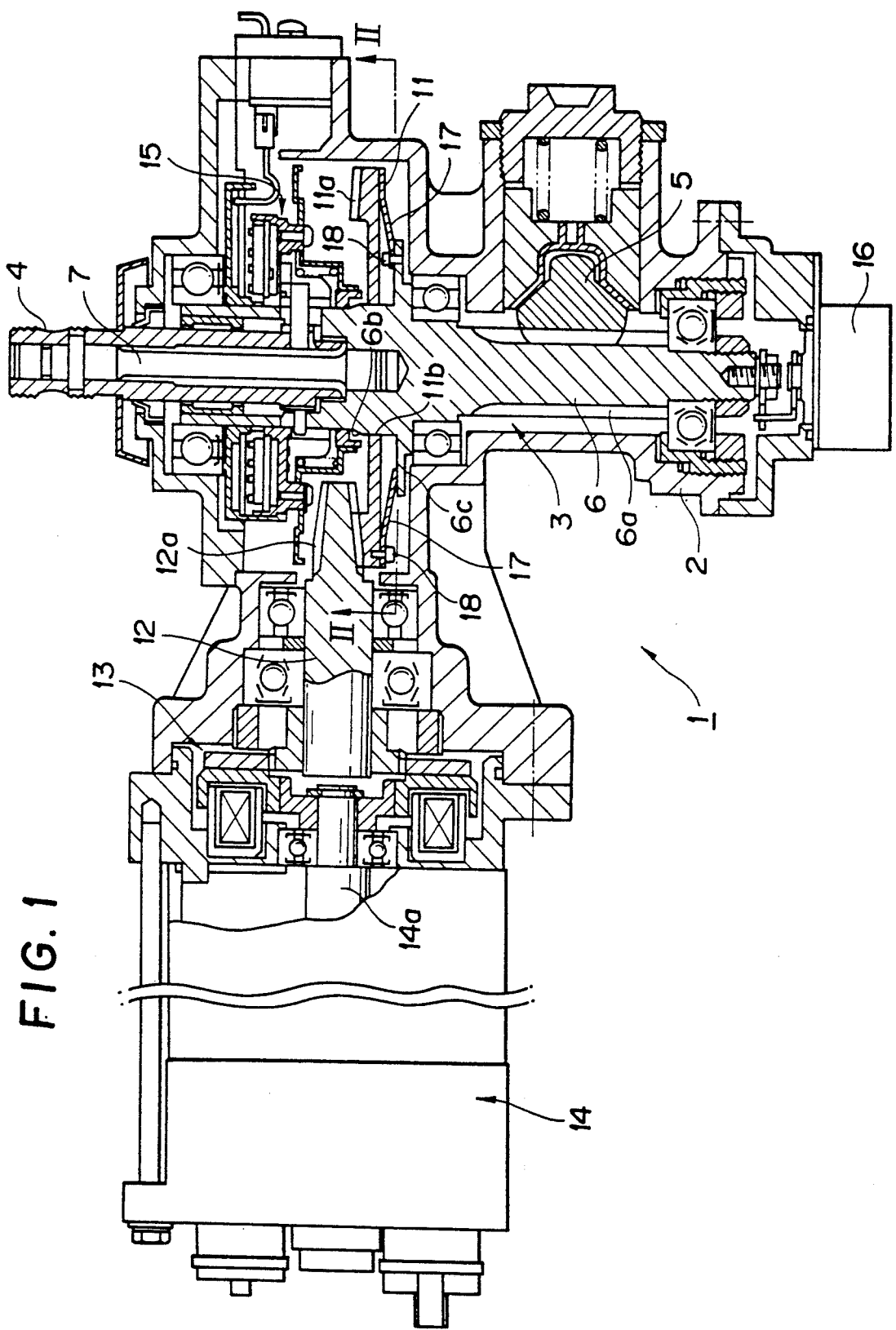
FIG. 1 is a side elevation, principally in section, of one embodiment of the invention.

Referring to the drawings, several embodiments of the invention will now be described. An electrically driven power steering apparatus 1 shown in FIG. 1 includes a casing 2 in which a steering shaft 3 is rotatably mounted. The steering shaft 3 comprises an input shaft 4 having an end which projects externally of the casing 2 and on which a steering wheel, not shown, is mounted, an output shaft 6 having a pinion 6a formed thereon which meshes with a rack 5 mechanically coupled to a road wheel, not shown, and a torsion bar 7 which couples the input shaft 4 and the output shaft 6 together in a manner to permit a relative rotation therebetween within a given range of angle.

The output shaft 6 includes a portion 6b of a greater diameter in which the lower end of the torsion bar 7 is fitted and on which a bevel gear 11 of a greater diameter is mounted. The bevel gear 11 is formed by a hypoid gear including teeth 11a which face upwardly. The bevel gear 11 meshes with a bevel gear 12 of a reduced diameter which is rotatably mounted in the casing 2.

The bevel gear 12 of reduced diameter is coupled through a solenoid operated clutch 13, which is disposed adjacent thereto, to the drive shaft 14a of an electric motor 14. Accordingly, when a controller, not shown, operates the motor 14 and the clutch 13 is turned on, the bevel gear 12 may be driven for rotation in either forward or reverse direction. Upon rotation of the bevel gear 12, the bevel gear 11 of greater diameter which meshes with the bevel gear 12 of reduced diameter as well as the output shaft 6 will be driven to rotate through a given angle either forwardly or reversely, thus enabling a steerable wheel, not shown, to be driven through the rack 5.

A detection mechanism 15, which is constructed in a known manner, is disposed within the casing 2 above and adjacent to the bevel gear 11 of greater diameter and in surrounding relationship with the output shaft 6. The purpose of the detection mechanism 15 is to derive a detection signal delivered to the controller mentioned above by detecting a relative displacement in the circumferential direction and the direction of such displacement of the torsion bar 7 connected between the input shaft 4 and the output shaft 6 as such bar is twisted.

The controller mentioned above normally maintains the clutch 13 in its on condition, and operates to drive the motor 14 for rotation in either forward or reverse direction on the basis of an input signal from the detection mechanism 15 and data which is previously stored, thus causing the rack 5 to be driven through the both bevel gears 12, 11 and the output shaft 6.

As the output shaft 6 is driven for rotation in this manner, the angle through which it has rotated and the direction in which it has rotated is detected by an angle of rotation detector 16 which engages the bottom end of the output shaft 6, the detector 16 delivering a signal to the controller mentioned above. In response to signals fed from the detection mechanism 15 and the detector 16, the controller compares these signals against each other and if an error occurs therebetween which exceeds a permissible extent, it turns the clutch 13 off, thus disengaging the bevel gear 12 from the motor 14.

The described arrangement and its operation are essentially the same as those of a conventional electrically driven power steering apparatus. However, it is to be noted that in the present embodiment, the bevel gear of greater diameter 11 is mounted on the output shaft 6, by forming a through-opening 11b in the central portion of the bevel gear 11, which is fitted around the portion 6b having a greater diameter of the output shaft 6 in a rotatable and slidable manner. The bevel gear 11 and the output shaft 6 are connected together by a leaf spring 17 to permit the bevel gear 11 and the output shaft 6 to be displaced axially relatively to each other, but to be incapable of relative displacement in the rotational direction.

Figure 2:
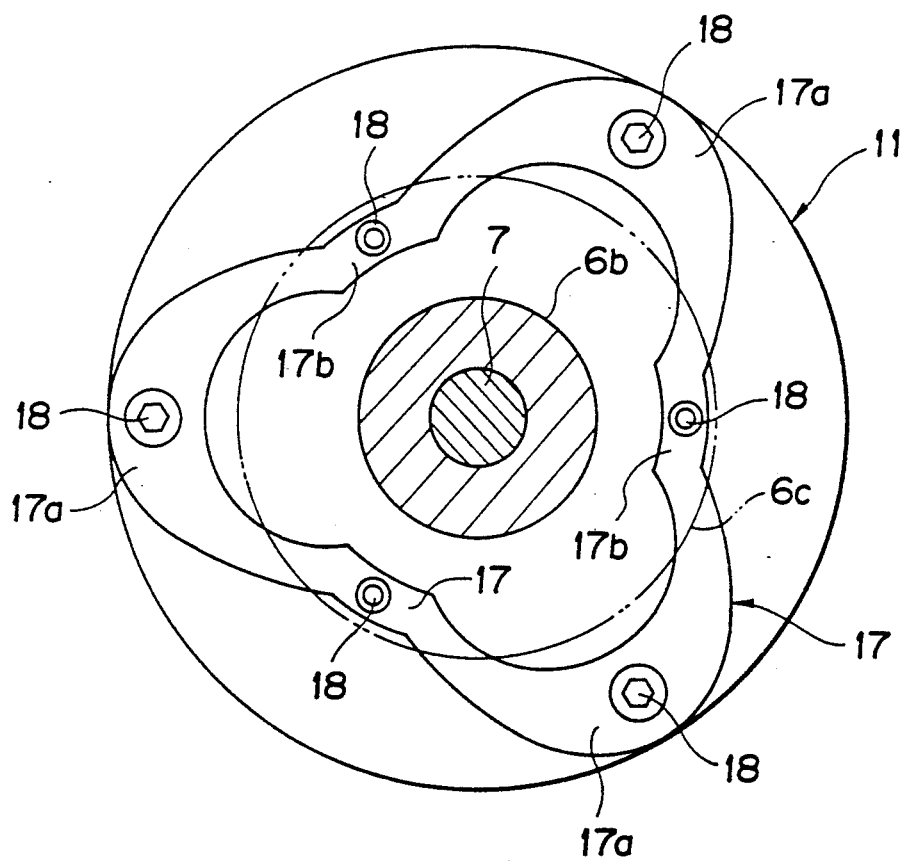
FIG. 2 is a cross section taken along the line II—II shown in FIG. 1.

Referring to FIG. 2, the leaf spring 17 is in the form of a generally triangular frame which surrounds the output shaft 6. At the apices of the triangle, it includes first connection points 17a which are disposed radially outermost and which are connected to the lower surface of the bevel gear 11 around its outer periphery by means of bolts 18. The leaf spring also includes second connection points 17b which are located intermediate adjacent first connection points 17a. The second connection points 17b are also offset radially inward of the first connection points 17a and are axially displaced from the first connection points 17a. These second connection points 17b are connected to a flange 6c on the output shaft 6, located below the portion 6b having a greater diameter, by means of bolts 18.

When the output shaft 6 and the bevel gear 11 of greater diameter are connected together by the leaf spring 17 in the manner mentioned above, the resilience of the leaf spring 17 is effective to urge the bevel gear 11 upward, whereby the teeth 11a of the bevel gear 11 is urged into abutment against the teeth 12a of the bevel gear 12 to prevent a backlash therebetween from occurring. This prevents the occurrence of sounds of percussion which might otherwise occur as a result of the abutment of the teeth 11a, 12a of the both gears 11, 12 against each other, and also prevents impacts or rattling during a kickback.

Since the bevel gear 11 of greater diameter and the output shaft 6 are connected together by the leaf spring 17 in a manner to disable a relative rotation therebetween, sounds of percussion which might result from the presence of a clearance between connected parts as when the both members are splined together or the key member is used to connect them together is prevented. In addition, the manufacturing cost can be reduced as compared with the use of a splined coupling or the key connection.

It is to be recognized that a great difficulty will be experienced to fabricate all the teeth of the both bevel gears 12 and 11, which comprise hypoid gears, to an equal, exact configuration. Accordingly, a fluctuation in the torque will be produced during the meshing engagement between these gears, but the resilience of the leaf spring 17 is effective to relax such fluctuation in the torque, thus improving a steering feeling transmitted to a driver through the steering shaft 3. Conversely, the hypoid gears which comprise the bevel gears 12 and 11 may be machined with a rough or reduced accuracy without degrading the steering feeling, thus facilitating the fabrication of these gears.

Figure 3:
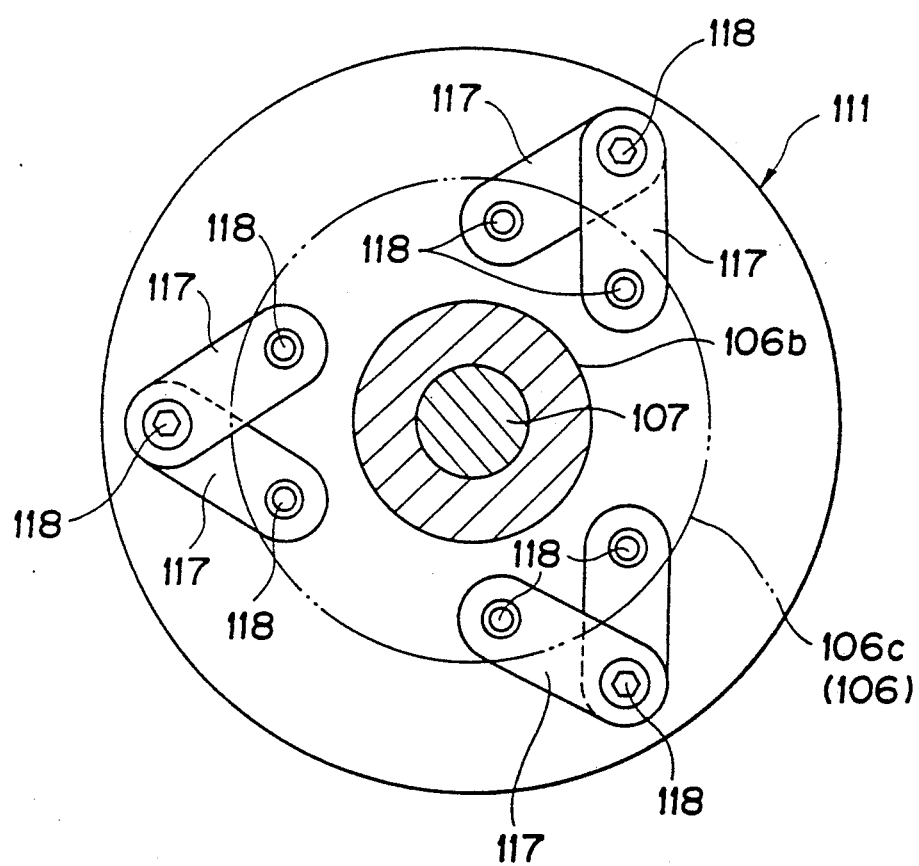
FIG. 3 is a cross section corresponding to FIG. 2 for another embodiment of the invention.

Referring to FIG. 3, a second embodiment of the invention will be described. In the first embodiment mentioned above, the single leaf spring 17 in the form of a frame has been used to connect the output shaft 6 and the bevel gear 11 of greater diameter together. However, in the second embodiment, pairs of leaf springs 117, each disposed in V-configuration, are disposed at three points around an output shaft 106. Each free end of the respective leaf spring 117, which is located radially inward, is connected to a flange 106c formed on the output shaft 106 by means of a bolt 118 while the junction of the V-shape or the other end of the respective leaf spring 117, which is located radially outward, is connected to a bevel gear 111 of a greater diameter by a bolt 118. In this embodiment, parts corresponding to those used in the first embodiment are designated by like numerals as used in the first embodiment, to which 100 is added. It will be apparent that a similar function and effect can be achieved in this embodiment as in the first embodiment.

While the use of hypoid gears has been assumed to construct the both bevel gears 11 and 12 in the described embodiments, it should be understood that these bevel gears are not limited to hypoid gears.

While the invention has been described above in connection with several embodiments thereof, it should be understood that a number of changes, modifications and substitutions therein will readily occur to one skilled in the art from the above disclosure without departing from the scope and spirit of the invention defined by the appended claims.

What is claimed is:

1. An electrically driven power steering apparatus including a steering shaft rotatably journalled and coupled to a steering wheel, a bevel gear of a reduced diameter which is coupled to an electric motor, and a bevel gear of a greater diameter mounted on the steering shaft for meshing engagement with the bevel gear of reduced diameter; characterized in that the bevel gear of greater diameter is mounted on the steering shaft so as to be axially displaceable thereon, urging means being provided to urge the teeth of the bevel gear of greater diameter toward the teeth of the bevel gear of reduced diameter, the urging means being effective to connect the bevel gear of greater diameter and the steering shaft in a manner to prevent a relative rotation therebetween, the steering shaft comprising an output shaft, the urging means comprising a leaf spring in the form of a generally triangular frame, the leaf spring being disposed in surrounding relationship with the output shaft of the steering shaft and mounted between the output shaft and the bevel gear of greater diameter.

2. An electrically driven power steering apparatus according to claim 1 in which the bevel gear of reduced diameter is coupled to the electric motor through a solenoid operated clutch.

3. An electrically driven power steering apparatus according to claim 1 in which both bevel gears comprise hypoid gears.

4. An electrically driven power steering apparatus according to claim 1 in which the steering shaft further comprises an input shaft having one end which projects externally of a casing and which is connected to a steering wheel, said output shaft having a pinion formed around its periphery for meshing engagement with a rack which is coupled to a steerable road wheel, and a torsion bar for coupling the input shaft and the output shaft together in a manner to permit a relative rotation therebetween within a given range of angle.

5. An electrically driven power steering apparatus including a steering shaft rotatably journalled and coupled to a steering wheel, a bevel gear of a reduced diameter which is coupled to an electric motor, and a bevel gear of a greater diameter mounted on the steering shaft for meshing engagement with the bevel gear of reduced diameter; characterized in that the bevel gear of greater diameter is mounted on the steering shaft so as to be axially displaceable thereon, urging means being provided to urge the teeth of the bevel gear of greater diameter toward the teeth of the bevel gear of reduced diameter, the urging means being effective to connect the bevel gear of greater diameter and the steering shaft in a manner to prevent a relative rotation therebetween, the steering shaft comprising an output shaft, the urging means comprising a plurality of pairs of leaf springs, each pair being connected between the output shaft which forms the steering shaft and the bevel gear of greater diameter.

6. An electrically driven power steering apparatus according to claim 5 in which the bevel gear of reduced diameter is coupled to the electric motor through a solenoid operated clutch.

7. An electrically driven power steering apparatus according to claim 5 in which both bevel gears comprise hypoid gears.

8. An electrically driven power steering apparatus according to claim 5 in which the steering shaft further comprises an input shaft having one end which projects externally of a casing and which is connected to a steering wheel, said output shaft having a pinion formed around its periphery for meshing engagement with a rack which is coupled to a steerable road wheel, and a torsion bar for coupling the input shaft and the output shaft together in a manner to permit a relative rotation therebetween within a given range of angle.

* * * * *